Nov. 18, 1924.

E. WEBER

ICE MAKING

Filed Jan. 5, 1924    2 Sheets-Sheet 1

1,516,167

INVENTOR
Erich Weber
BY
Pennie, Davis, Marvin, + Edmonds
ATTORNEYS

Nov. 18, 1924.
E. WEBER
ICE MAKING
Filed Jan. 5, 1924   2 Sheets-Sheet 2
1,516,167
Fig. 5,
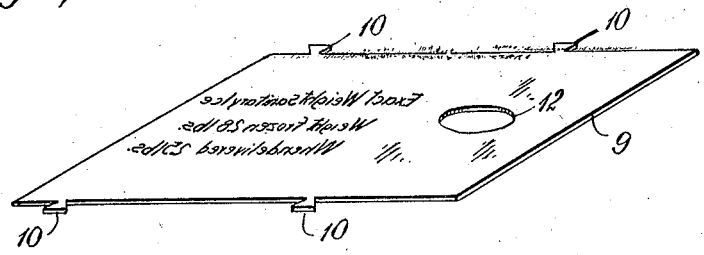
Fig. 6,
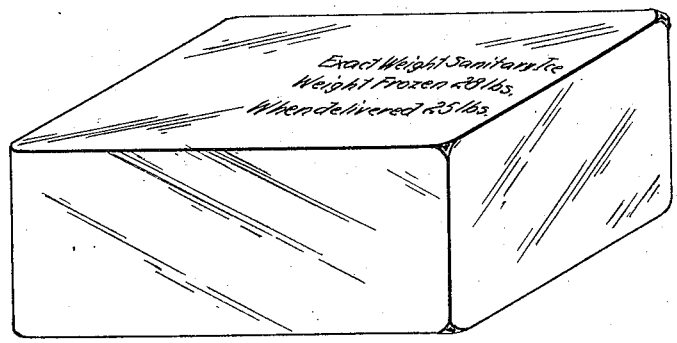
INVENTOR
Erich Weber
BY
Pennie, Davis, Marvin, & Edmonds
ATTORNEYS Patented Nov. 18, 1924.

1,516,167

UNITED STATES PATENT OFFICE.

ERICH WEBER, OF SUPERIOR, ARIZONA.

ICE MAKING.

Application filed January 5, 1924. Serial No. 684,483.

*To all whom it may concern:*

Be it known that I, ERICH WEBER, a citizen of the United States, residing at Superior, in the county of Pinal, State of Arizona, have invented certain new and useful Improvements in Ice Making; and I do hereby declare the following to be a full, clear, and exact description of the invention, such as will enable others skilled in the art to which it appertains to make and use the same.

This invention relates to certain improvements in ice making and has for its object increased plant capacity and more particularly the production of cakes of ice of suitable character and condition for immediate delivery to the ultimate consumer.

The acknowledged best practice in ice making has been to freeze water in containers, adapted to form a cake of ice weighing about 300 pounds, by placing the containers in cold brine solution. To expedite handling these huge cakes of ice must necessarily be cut into smaller cakes prior to delivery to the ice dealer for distribution to the ultimate consumer. The various needs of the ultimate consumers necessitate the further division of the cakes into smaller cakes of suitable size and weight. This latter division is usually performed in an unsystematic manner, for example, as by making a guess as to the size of cake which will give the weight for which the consumer is to be charged. The result is that the consumer seldom obtains the full quantity of ice for which he pays.

The present invention contemplates the production of a plurality of cakes of ice of predetermined size and weight in one container where heretofore one large cake has been formed. Thus, in accordance with the invention, I provide the container with a divider of good heat conducting material such as copper, aluminum, or galvanized iron for promoting the solidification of the water therein along predetermined lines so as to form a plurality of cakes of ice in one container. I have discovered that the water begins to freeze along the walls of the container and along the surface of the divider, thereby effectively dividing the freezing water in a plurality of cakes of ice. Either the divider, or container may bear an inscription which will be impressed upon the ice during freezing to indicate the size or weight of each cake. If desired the cakes of ice thus formed may be placed in a sanitary delivery container to protect the ice and prevent excessive melting during delivery. In this manner the consumer is assured of full weight.

An embodiment of the invention may take the form of a container with one or more dividers horizontally disposed within the container. Each divider may have an opening to permit filling the container from the top with water. The dividers may be appropriately positioned and supported in vertical slots or grooves in the wall of the container so as to permit movement in response to expansion of the freezing water. After the dividers have been positioned in the container, the slots may be filled with strips or packing of any suitable material, such as semi-hard rubber, to insure the formation of a smooth surface on the cake of ice.

Thus, in accordance with the invention the time required for freezing the blocks of ice is substantially lowered, the cost of handling in the plant decreased, and the consumer is assured of obtaining full weight.

The invention will be more clearly understood by reference to the following detailed description in conjunction with the accompanying drawings in which, Fig. 1 is a vertical view in section of a container embodying the invention;

Fig. 5 is a view in perspective of the divider for the container; and

Fig. 6 is a view in perspective of a cake of ice formed in accordance with the invention.

Figure 1:
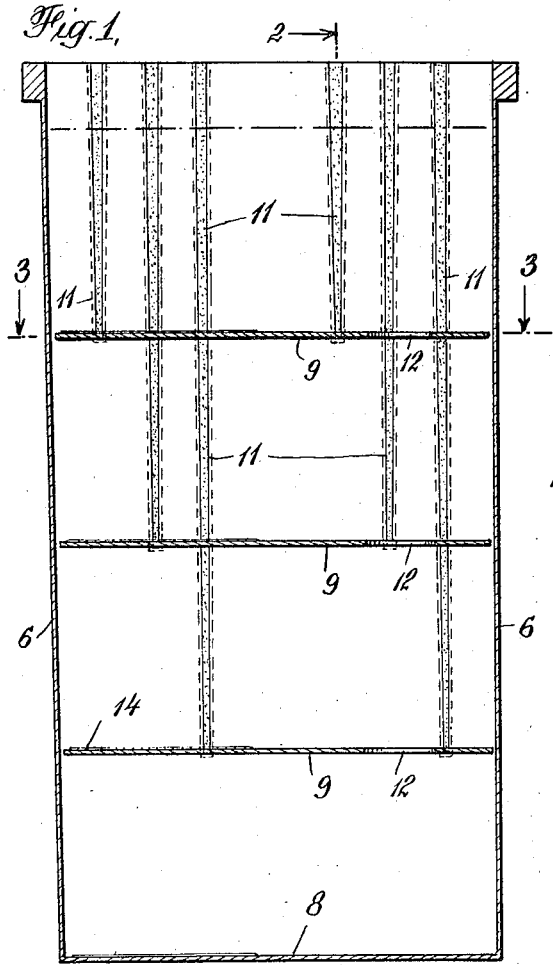
Figure 2:
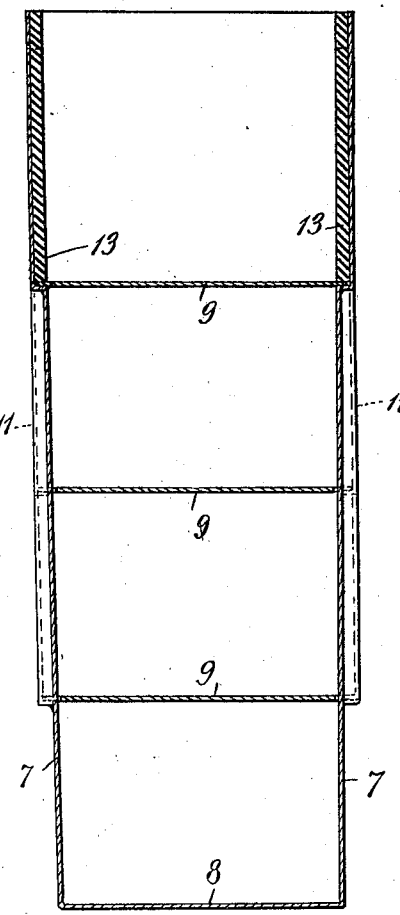
Fig. 2 is a vertical view in section taken along the line 2—2 of Fig. 1.
Figure 3:
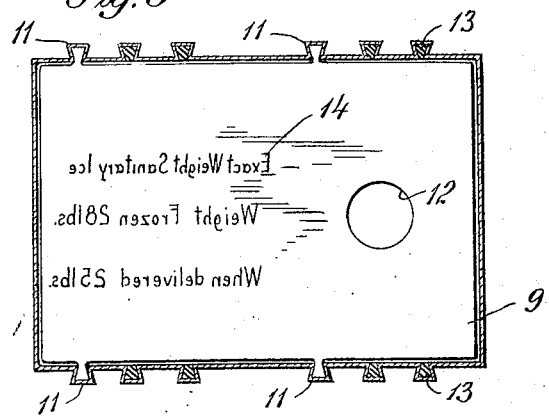
Fig. 3 is a plan view in section along the line 3—3 of Fig. 1.
Figure 4:
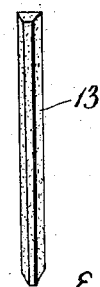
Fig. 4 is a view of the filling strip or packing for the slots in the wall of the container.

The container of the invention may be of any desired configuration. In the drawings is shown a container of rectangular cross-section comprising enclosing walls 6 and 7, inclined slightly to the bottom 8 to facilitate sliding the ice out of the container. A plurality of compartments of predetermined size are formed by positioning within the container suitable dividers 9 preferably of good heat conducting material, such as copper, aluminum, or galvanized iron. The dividers 9 have supporting lugs 10 integral therewith resting upon the lower extremity of guides or slots 11 in the walls 7. The slots 11 are larger at the top than at the bottom to facilitate positioning of the dividers 9 within the container. Each divider 9 has an opening 12 for intercommunication between the compartments. A strip or packing 13 of suitable material, such as semi-hard rubber, is placed in the slots 11 to fill the same flush with the wall of the container after the divider has been positioned. The strips 13 may be lubricated slightly with a suitable lubricant, such as graphite, to allow them to slide down into the slots 11 easily, and to be forced up as expansion of the ice occurs. An impression or feature 14 is formed in each divider and in the bottom 8 to mark upon each cake the minimum weight of ice.

In using the container of the invention, the dividers 9 are appropriately positioned within the container by sliding down to the bottom of their own slots. The container is then placed in a cold brine solution and filled from the top with water. The water passes from the top compartment into the lower compartments through the opening 12 in each divider until the container is filled to an appropriate level. When the water is frozen and the ice ready to take out, everything will slide out without entailing any further labor than is now necessary when removing ice from an ordinary container.

Since all the cakes of ice of a given weight will run uniform in size, I provide sanitary delivery containers of suitable material, such as galvanized iron, having a cover and handle into which the ice as manufactured will be packed by a person wearing rubber gloves. This is performed at the plant in a room of the proper temperature, so that there will be no loss, and then loaded into trucks for prompt delivery.

When the dividers as well as the containers are constructed of good heat conducting material, heat is more readily conducted to the cold brine solution thereby promoting initial solidification of the water along the surfaces of the dividers as well as along the interior surfaces of the container. In this way the time required for the solidification of the water is materially decreased and the plant capacity may be increased as much as ten per cent.

When freezing sets in, the water or ice begins to expand with great force. Heretofore it has been impracticable to form a plurality of cakes of ice in one container because the expansion force tended to cause destruction of the container. In accordance with the present invention, a plurality of cakes of ice can be frozen in predetermined sizes in a single container, and all the expansion caused by the freezing water taken up at one end of the container by permitting the dividers to move freely in an upward direction in the containers in response to the expansion.

It is customary at the present time to freeze ice into blocks weighing about three hundred pounds this being the weight limit which can be economically handled under present conditions. With the expansion dividers of the present invention, a container would easily freeze ice to the amount of 1000 lbs. in 100 lb. blocks, or in blocks of any other desired weight.

In accordance with the invention each divider and the bottom of the container will embody some feature which will freeze into the ice to denote the weight of each block of ice when frozen and (or) the minimum weight when delivered to the ultimate consumer. This is extremely advantageous inasmuch as it assures one obtaining full weight.

I claim:

1. A device for forming a plurality of blocks of ice comprising a container for water to be frozen, vertical slots in the wall of the container, a divider horizontally disposed within the container and having projections adapted to slide freely in the slots in the wall of the container.

2. A device for forming a plurality of blocks of ice of predetermined size comprising a container for water to be frozen, a divider of good heat conducting material disposed horizontally within the container for promoting solidification of the water along predetermined lines, and an opening in the divider, and vertical slots in the wall of the container for positioning and supporting the divider in the container, said divider having projections adapted to slide freely in the vertical slots in the wall of the container.

3. A device for forming a plurality of blocks of ice of predetermined size comprising a container, an horizontally disposed partition forming superposed compartments in the container, vertical slots in the wall of the container, said partition having projections adapted to slide freely in the vertical slots in the wall of the container, and means for filling the slots flush with the walls of the container when the partition is in operating position and permitting movement of the partition in response to expansion of the freezing water.

4. A device for forming a plurality of blocks of ice of predetermined size comprising a container, an horizontally disposed partition forming superposed compartments in the container, slots in the wall of the container, projections on said partition adapted to slide freely in said slots for positioning and supporting the partition in the container, and means for filling the slots flush with the walls of the container when the partition is in operating position and permitting movement of the partition in response to expansion of the freezing water, and means for intercommunication between said compartments.

In testimony whereof I affix my signature.

ERICH WEBER.